INVENTOR
STEPHEN LINN

Sept. 20, 1971 S. LINN 3,606,014
APPARATUS AND METHOD FOR DETECTING UNFILLED CONTAINERS
Filed Dec. 15, 1969 2 Sheets-Sheet 2
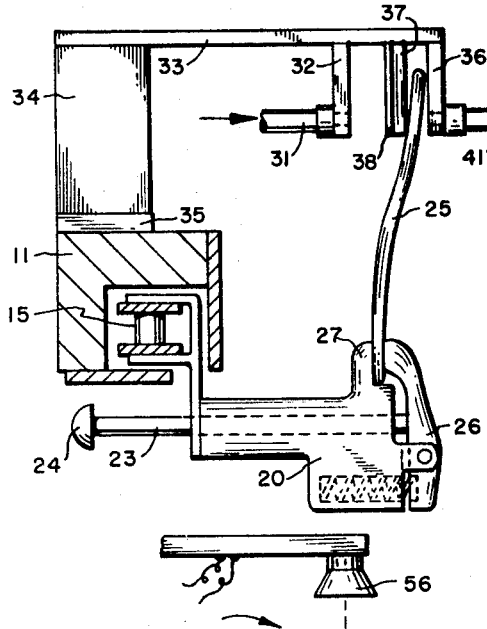
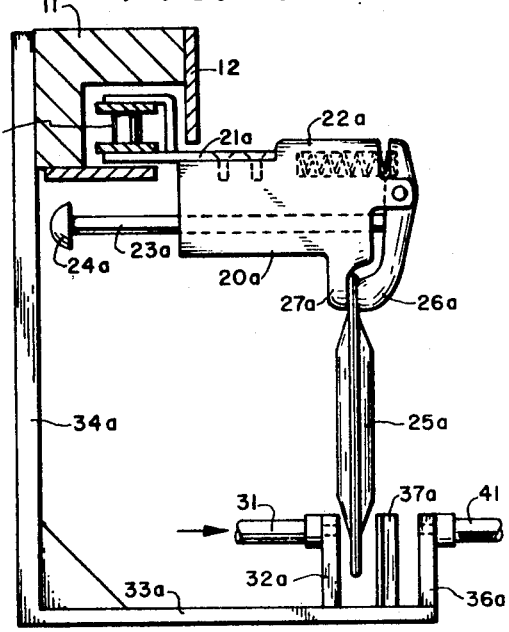
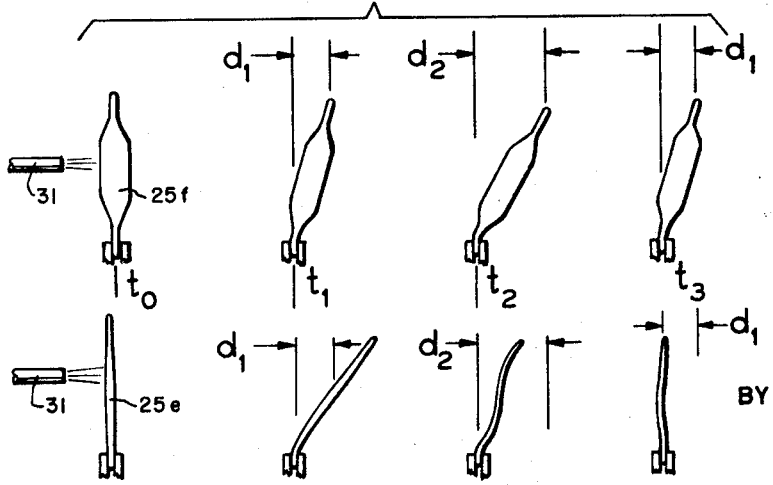
INVENTOR
STEPHEN LINN
ATTORNEYS

United States Patent Office 3,606,014
Patented Sept. 20, 1971

3,606,014
APPARATUS AND METHOD FOR DETECTING UNFILLED CONTAINERS
Stephen Linn, Tenafly, N.J., assignor to General Foods Corporation, White Plains, N.Y.
Filed Dec. 15, 1969, Ser. No. 885,102
Int. Cl. B07c 5/00
U.S. Cl. 209—79                   14 Claims

ABSTRACT OF THE DISCLOSURE

A packaging machine, adapted to grip flexible containers along one edge thereof for conveying the containers seriatim through various stations, applies a uniform impulse to each container in a direction perpendicular to the direction of conveyor travel. The impulse deflects each container within a predetermined time period an extent inversely proportional to the mass represented by the container and its contents. The containers which deflect a greater extent than the extent of deflection of a filled container are identified and subsequently rejected.

BACKGROUND OF THE INVENTION

This invention relates generally to the detection, among a series of physical objects having uniform size, of those objects which on the basis of their respective masses deviate from a predetermined norm. Particularly, the invention relates to the detection of physical objects whose masses are below that of a predetermined norm.

The invention has particular utility in equipment designed for packaging products, especially dry products of a granular or powdery nature, in flexible containers such as pouches or envelopes. Packaging machinery now in general use operates at high speed and continuously to fabricate containers, such as envelopes or pouches, from a web of flexible packaging material, whether it be paper, foil, film or various laminates thereof, advance said containers to a filling station for receiving their intended contents, then advancing the containers to a sealing station for completely enclosing the contents within the containers, and then subsequently discharging the containers as completely packaged units. Said machines are designed to deposit a uniform quantity of product into each and every container. However, there are circumstances under which an occasional container may fail to receive its intended quantity of product, and in such instances it is extremely important that these containers be identified and separated from the correctly filled containers so as to prevent the unfilled containers from possibly finding their way into the marketplace in non-compliance with their labelling.

Various methods and devices have been utilized in attempting to solve this problem. Some such devices utilize weighing principles for detecting unfilled envelopes, but these devices are of necessity relatively expensive, slow acting and not particularly well suited to high-speed packaging especially when the contents are relatively light in weight. Other techniques which have been employed operate on the bulk sensing principle which in effect measures the thickness of an envelope or pouch by providing a variable gap through which each envelope passes. Detecting mechanism of this type also is not well suited to high-speed packaging of relatively light weight products due to the extreme sensitivity required to differentiate between the bulk of a filled container as opposed to that of a partly filled or even empty container.

SUMMARY OF THE INVENTION

The present invention operates on the principle of detecting unfilled pouches on the basis of their difference in mass. In accordance with the present invention, each container is considered a unit mass of uniform volume but which may differ from another in density depending on whether it is filled with product or to some degree at least unfilled. The relative mass of each container is determined by applying to each container an impulse of uniform force and duration in a direction to cause deflection of the container from its normal course of travel. Differentiation between full and unfilled packages is made by virtue of the extent the respective container deflects under said uniform impulse within a predetermined time interval, i.e., the respective velocity of deflection. The unfilled containers will deflect at a greater velocity, and therefore a greater extent within the same time interval, than the filled containers. The magnitude of the differential between the velocity of deflection between filled and empty containers is so great that the concept may effectively be employed to detect containers which are substantially full and fall short of being full by a relatively small degree.

The various features of the invention and the advantages accruing therefrom will be apparent from the following description when read in conjunction with the accompanying drawing wherein:

FIG. 4 is a sectional view taken along line 4—4 of FIG. 2;

FIG. 5 is a view similar to FIG. 4 but showing a modified form of the invention;

FIG. 6 is an elevational view of an alternative feature of the invention; and

FIG. 7 is a graph illustrating the relative extents of deflection between filled and empty envelopes within the same time intervals and under uniform impulses.

Figure 1:
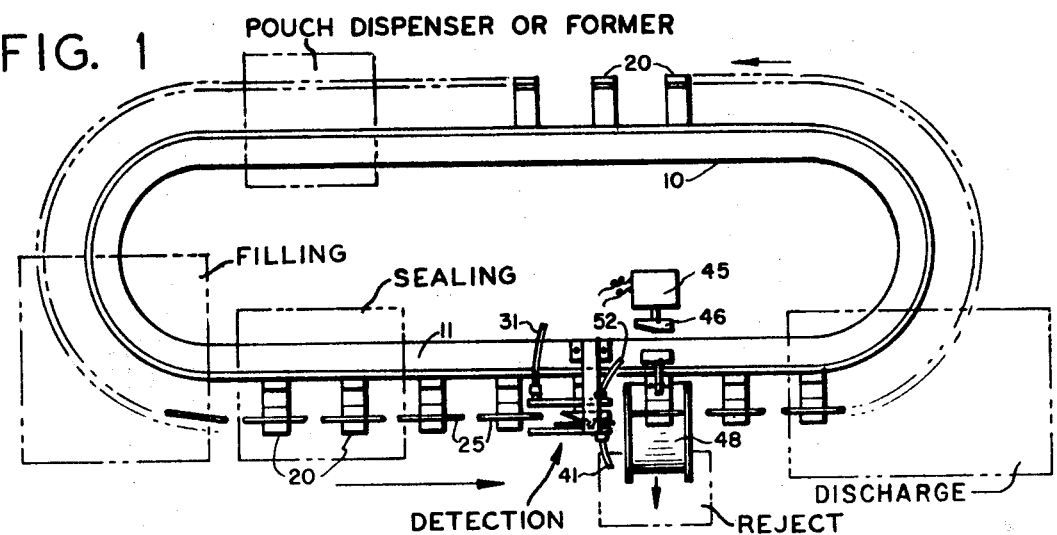
FIG. 1 is a schematic view in plan of packaging apparatus incorporating the inventive subject matter herein disclosed.

Referring now to the drawing, FIG. 1 illustrates schematically the layout of a typical pouch filling and sealing machine wherein the pouches are transported over a generally oval course through the various stages by an endless conveyor mechanism partially enclosed within a housing 10 mounted on any suitable framework and comprised of an inverted angle bar 11 (see also FIG. 3) which in cooperation with a depending plate 12 suitably secured thereto defines an inverted channel or slot accommodating a chain 15. The chain is strung around the oval course defined by the housing 10 and may be driven in any suitable manner by conventional means such as for example sprocket wheels, not shown, which in this instance would be disposed at each end of the oval course of the chain and which in turn are rotated in any suitable manner by a mechanical power source such as an electric motor, or the like, not shown. Supported from the chain 15 are a plurality of laterally extending pouch carriers 20 evenly spaced from one another along the chain and adapted to grip an envelope or pouch 25 along one of its edges and to thereby carry it through the various stages of the apparatus. In the schematic layout shown in FIG. 1, a chain strung through the housing 10 is adapted to be driven around its oval course in a counterclockwise direction and, in so doing, transporting the pouch carriers 20 into position for receiving a pouch 25 from a pouch dispenser or former which may be considered the first stage of the machine's operation. The carrier then transports the pouch with its top edge opened and spread apart to a filling station at which stage it receives a measured amount of product. From the filling station the pouches are transported by the carriers 20 to a sealing station whereat the top edges of the pouch are sealed together to fully enclose the product within the pouch. From the top edge sealing station, the pouches are ultimately transported by the carriers to a discharge station where they are released from the carriers which continue to travel around and in due course receive another pouch upon their return to the pouch dispenser or former station of the apparatus.

In accordance with the invention the pouches, after leaving the sealing station of the apparatus, are caused to be transported through a detection stage operative for identifying sealed pouches which for any reason fail to contain the prescribed amount of product, the mechanism for achieving this identification being more fully described hereinafter. If desired, the pouches which are identified as containing less than the prescribed amount of product may be released from their carriers and effectively rejected prior to reaching the discharge station whereat the properly filled pouches are released and collected for further processing in the overall packaging operation.

Figure 2:
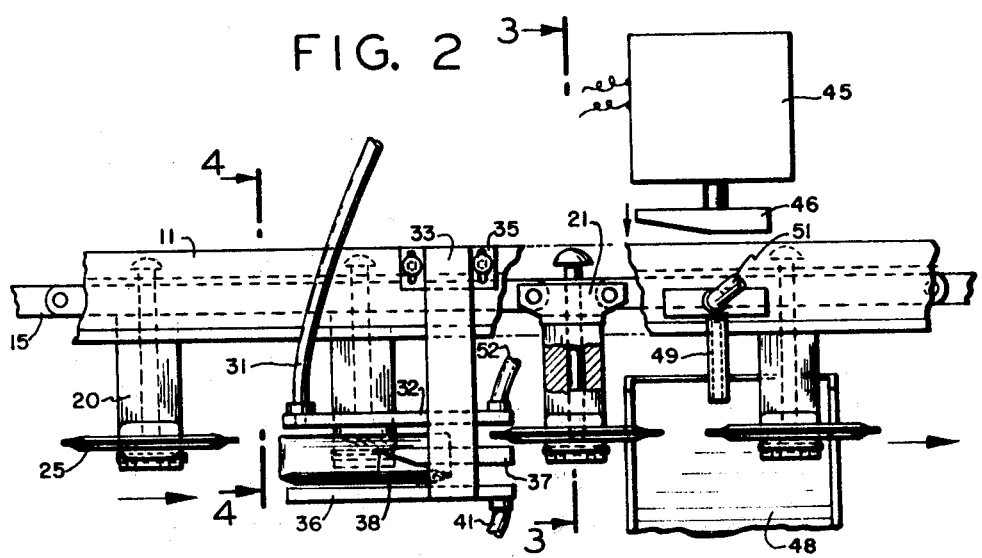
FIG. 2 is a plan view in detail of the detecting stage mechanism of the machine illustrated in FIG. 1.
Figure 3:
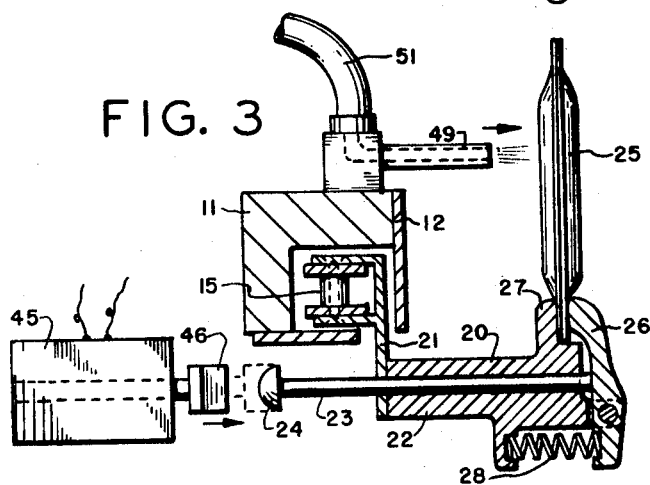
FIG. 3 is a sectional view taken along line 3—3 of FIG. 2.

As can be seen by reference to FIGS. 2 and 3, each carrier 20 comprises an assembly which is suspended from chain 15 by means of a double flanged hanger 21, the flanges of which serve as links of the chain. The lower depending portion of the hanger is suitably secured to a carrier housing 22 extending outward laterally beyond the chain and formed with an interior bore accommodating a slidable plunger 23, the inner end of which is provided with a head portion 24. The outer end of plunger 23 is disposed to engage a clamp 26 pivotally mounted on the housing 22. Clamp 26 is shaped at its upper extremity to serve as a releasable jaw which in cooperation with a fixed jaw 27, provided by an abutment of the housing 22, operates to clamp or grip the bottom edge of a pouch or envelope 25. The clamping plate 26 is biased towards its closed clamping position by a compression spring 28. The clamp or gripper mechanism is opened to release a pouch 25, or to receive the edge of a pouch between the jaws 26, 27, by a mechanism operated to slide the plunger 23 outwardly from its position shown in FIG. 2 thereby rocking the clamp 26 in a clockwise direction against the tension of spring 28.

The pouches 25 may be made of any suitable packaging material such as paper, with or without laminations of foil, plastic, etc. The embodiment of the invention illustrated in FIG. 3 is adapted for pouches fabricated from material of sufficient weight and stiffness as to be self-supporting, even if filled with product, when gripped along its bottom edge as indicated in FIG. 3. Thus the pouches 25 will normally assume an upright substantially vertical attitude as they leave the sealing stage of the apparatus and are conveyed toward the discharge station of the apparatus.

The mechanism for detecting unfilled pouches is disposed along the path of conveyor travel at a location beyond the top edge sealing mechanism and before the discharge station. This mechanism includes suitable means for subjecting each pouch as it travels through the detection stage to a uniform impulse directed perpendicularly to the direction of conveyor travel such as to deflect each pouch away from its substantially vertical upright attitude. In the embodiment of the invention illustrated in FIGS. 2 and 4, this impulse is imparted pneumatically by a jet of air or other suitable gas blown from one end of a flexible tube or hose 31, the other end of which tube is connected to a suitable pressurized source, not shown. The discharge end of tube 31 is oriented so as to direct the air jet against the inner side surface of each pouch 25 after it leaves the top sealing station. As will be seen, the discharge end of the air tube or hose 31 attaches to a suitable fitting by which it is mounted in fluid communication with a port or orifice in a guide bar 32 extending in a direction parallel to the path of conveyor travel. The bar 32 in turn is secured in any suitable manner to a support arm 33 of an integral support assembly, including a post 34 having feet 35 adapted to enable adjustable attachment of the support assembly to the conveyor housing 10. The bar 32 serves as an inner guide for pouches as they are being transported through the detecting stage of the apparatus. Also secured to the support arm 33 is a guide bar 36 disposed substantially parallel to the direction of conveyor travel and serving as an outer guide for pouches being transported through the detecting stage. The support arm 33 also holds a divider or stripper bar 37 extending parallel to the direction of conveyor travel and at a position intermediate the guide bars 32, 36. The divider bar 37 serves as an outer guide for the normally filled pouches traveling through the detection stage and as an inner guide for the pouches which have been identified as being unfilled while passing through the detection stage of the apparatus. The end of bar 37 facing rearwardly (relative to direction of conveyor travel) is preferably beveled so as to provide this end of the bar with a pointed edge 38 for maintaining a sharp line of separation between the normally filled pouches and those which are detected as being less than fully filled. From the foregoing, it will be apparent that the guide bars 32, 36, 37 define two separate channels for the upper portion of each pouch being conveyed through the detection stage. The channel defined by plates 32, 37 accommodates the normal filled pouches which remain substantially undeflected, before reaching the sharpened edge 38 of the divider bar 37, by the air jet emanating from the tube 31. The channel defined by plates 36, 37 accommodates those pouches which due to their unfilled state are substantially deflected at the time of reaching the edge 38 of divider bar 37 due to the deflecting impulse by the air jet from tube 31. The bar 37 operates to retain these pouches in the deflected state after passing beyond the air jet so as to enable activation of mechanism operating to release said pouches from the conveyor and achieve their rejection prior to reaching the discharge station of the apparatus.

The force of the air jet emanating from the tube 31 is pre-adjusted in accordance with the distance of conveyor travel between the orifice of the tube 31 and the pointed edge 38 of the divider plate 37, the velocity of the conveyor, and the respective masses represented by a normally filled pouch and unfilled pouch. The magnitude of the deflecting impulse imparted to each pouch is the product of the force of the air jet times the period during which it is applied. The extent of deflection of the pouches would theoretically be the same in all cases regardless of whether a pouch was filled or unfilled, i.e., constituting a large or relatively small mass. However, the velocity at which a pouch attains its maximum deflection is dependent upon the mass represented by the respective pouch, the velocity in each case being inversely proportional to the mass of the pouch. Accordingly, the force of the air jet, the conveyor speed, and the distance of pouch travel after being subjected to said air jet and before reaching the pointed edge of the divider 37 is correlated with the various masses represented by the pouches of any given application so that a filled pouch, representing the larger mass, will not in the given time period deflect outwardly beyond the edge 38 of the divider bar 37 so as to be guided into the outer or reject channel of the detection mechanism, but rather will remain substantially undeflected within said period and thereby be guided through the inner channel of the detection mechanism. On the other hand, those pouches which are unfilled and thereby represent a lesser mass will deflect under the same impulse at a higher velocity so that in the same given time period their extent of deflection will be such as to cause their upper edges to pass outwardly beyond the edge of the divider bar 37 and thereby be guided through the outer or reject channel of the detection mechanism.

FIG. 7 graphically illustrates in a typical application the difference in velocity of deflection between a normally filled pouch 25f and an empty pouch 25e. For purposes of this illustration, it will be assumed that the deflecting impulse is a short blast of air from the orifice of tube 31 of the same predetermined force and duration in each instance so that the impulse imparted to the filled container 25f is of the same magnitude as that imparted to the empty container 25e. The containers in each instance are in a substantially upright vertical attitude at the beginning of the impulse which is the position shown at the time period $t_0$. At the end of the first increment of time following the beginning of the impulse, i.e. $t_1$, the filled pouch 25f at its top edge will have deflected an extent $d_1$. However, the empty pouch 25e within the same time $t_1$, will have deflected a considerably greater extent due to its increased deflection velocity resulting from its lower mass. By the end of the second time increment $t_2$, the filled pouch is shown deflected approximately its maximum extent, while at the same time the empty pouch has partly returned from its position of maximum deflection to its normal upright position. By the end of the third time increment $t_3$, the filled pouch 25f is shown as returning from its position of maximum deflection and at about the same degree of deflection $d_1$, as existed at the end of the first time increment $t_1$. The empty pouch 25e, by the end of the third time increment $t_3$, is shown as being fully restored to its original upright, substantially vertical attitude. Of course, it is understood that the restoring force resides in the natural resilience of the pouch structure which depends largely on the nature of packaging material employed and that the particular relative degrees of deflection may vary considerably from that illustrated in FIG. 7 depending upon the type of packaging material used as well as the amount of product contained in a filled pouch. In the case of pouches and contained product constituting respective masses as typified in the FIG. 7 illustration, the divider bar 37 of the detection apparatus would have its pointed edge 38 positioned to catch or direct into the reject channel any pouch which deflects an extent greater than $d_1$ in the first time increment $t_1$. Thus the pointed edge of said divider bar would be positioned along the conveyor route the distance from the leading edge of a pouch which the pouch travels within the time increment $t_1$.

FIGS. 2 and 4 show an unfilled pouch passing through the detecting stage of the apparatus. As will be seen the top edge of the pouch, as a result of the deflection imparted to the pouch by the air jet through tube 31, is guided through the reject channel defined by plates 36, 37. In order to achieve rejection of the unfilled pouches, means are provided for sensing each pouch which traverses the reject channel of the detecting mechanism so as to activate means for rejecting the pouch from the conveyor line. In the present instance a pouch in the reject channel is sensed by fluidic means which include a hose or tube 41 mounted on the guide plate 36 such as to be in fluid communication with the reject channel. The tube 41 runs to a fluidic switch or gate, not shown, which acts in response to the backpressure created by a pouch when traversing said reject channel to close an electrical circuit, not shown, indicating that the pouch at that moment being carried through the detecting station is an unfilled pouch. The circuit closed by the back-pressure fluidic switch energizes a solenoid 45 suitably mounted on housing 10, the armature of which solenoid carries a camming shoe 46 disposed to engage the head portion 24 of a plunger 23. The camming shoe 46 is normally in a retracted position clear of the plungers 23 as the carriers pass through the reject station. Energization of solenoid 45 extends the camming shoe 46 so as to engage the plunger 23 of the carrier 20 for the sensed unfilled pouch 25 causing the clamp 26 thereof to open and release the pouch 25 which then falls into a reject chute 48. The reject chute collects all pouches which have been found to be less than fully filled. In order to assure prompt release of a pouch from the grip of its associated carrier, means may be provided at the reject stage for blowing the pouch off the conveyor. Such means may include a nozzle 49 suitably mounted on the conveyor housing 10 over the reject chute and directed towards the inner surface of each pouch 25 as it passes over the reject chute. The nozzle 49 is in fluid communication with a hose 51 running to a suitable pressurized air source. The air blast from nozzle 49 will achieve the quick removal from its associated carrier of any unfilled pouch by reason of the associated gripping jaws being open. In the case of fully filled pouches, the gripping jaws of the associated pouch carrier remain closed so that the air blast from nozzle 49 merely causes a slight temporary deflection in the upright or vertical attitude of the pouch.

In certain installations it could be advantageous to sense also the fully filled pouches passing through the detection station. In such cases, filled-pouch sensing means similar to that just described for unfilled pouches could be provided and include a fluidic switch or gate, not shown, placed in fluid communication with the channel for filled pouches by an air hose or tube 52 mounted on the inner guide bar 36. By providing means for sensing filled pouches, the circuit for energizing solenoid 45 could include a self-holding feature such as a locking relay or the like. This would enable the energizing circuit to remain closed, should there be a long series of unfilled pouches detected, and thus prevent repeated energization-deenergization of the solenoid under these circumstances. In this arrangement the holding circuit would be under control of the fluidic switch used for sensing the filled pouches and operative in response thereto to open the holding circuit to deenergize the solenoid upon sensing the first filled pouch following the sensing of one or a series of unfilled pouches.

FIG. 5 illustrates a slightly modified form of the invention which is particularly adapted for use with pouches or envelopes formed of packaging material of a more flexible nature such that a pouch or envelope formed therefrom is not self-supporting when gripped along its bottom edge. In this embodiment of the invention, the carrier 20a has the same function as the carrier 20 of the previous embodiment, but is designed to grip the upper or top edge of a pouch 25a rather than the bottom edge. Corresponding elements of the carrier 20a are indicated by the same reference numerals as those employed for the carrier 20 of the first embodiment but with the suffix $a$ added thereto. Similarly the support or guide plates cooperating with the bottom edge of pouch 25a are designated by the same reference numerals as are those for the first described embodiment but with the suffix $a$ added.

FIG. 6 illustrates alternative means by which unfilled pouches may be detected in accordance with their velocity of deflection when subjected to a uniform deflecting impulse. In accordance with the embodiment of FIG. 6, photoelectric means disposed a predetermined distance in conveyor travel beyond the location of the deflecting impulse are utilized to detect those pouches which deflect more than a predetermined extent within the time interval required for the pouch to travel the predetermined distance. In the embodiment of FIG. 6, the photoelectric means which are not dependent upon provision of guide channels will generate an electrical signal whenever a pouch has deflected more than said predetermined amount so as to interrupt a light beam projected from a light source 55 onto a photoelectric cell 56. The photoelectric means comprising said light source and photoelectric cell are disposed so as to provide a light beam which is beyond the extent of deflection of a normally filled pouch when subjected to the deflecting impulse of an air blast from the orifice of air supply hose 31. The electrical signal generated by interruption of the light beam may be employed as in the case of the first described embodiment to energize the reject solenoid 45 to effect the removal of the unfilled pouch from its carrier and disposal thereof into a reject chute.

Of course it should be realized that other equivalent means could be provided to deliver to each pouch a uniform deflecting impulse, such as a mechanical paddle or striker synchronized with conveyor movement, and that other equivalent means could be employed to sense pouches in the respective channels of the detecting apparatus, such as microswitches or the like. Pressurized air means has been illustrated herein for both functions because of its particular adaptability to packaging machinery. Also it should be understood that the air jet for delivering the deflecting impulse may be either an intermittent blast synchronized with conveyor movement or may be a continuous jet which in highspeed packaging machines has an effect similar to that of intermittent or short blasts of air. The invention in the disclosed embodiment contemplates the use of a continuous jet of air from the air supply tube 31 and a conveyor moving continuously with the result that the impulse starts the moment the leading edge of the pouch crosses the moving air stream and continues as long as any part of the pouch is exposed to the air stream. Thus the time allotted for deflection of the pouch is the time consumed by the leading edge of the pouch traveling from the air stream to the edge 38 of the divider bar 37. In other applications wherein a short intermittent blast is utilized for the deflecting impulse, the impulse would ordinarily be delivered when the pouch is centered relative to the air jet, with the leading edge thereof further advanced. Accordingly in these applications the relative spacing between the location of the divider bar 37 and the air supply tube 31 would necessarily be appropriately increased.

What is claimed is:

1. In a machine for handling substantially flat pouch-like articles fabricated from flexible sheet material and including conveyor means having article carriers adapted to support said articles in a predetermined attitude while transporting same from one station to another, means disposed at a selected location along the route of said conveying means for imparting deflecting impulses of uniform magnitude to said pouches upon reaching said location, each said impulse causing the article to bend out of said predetermined attitude at a velocity determined by the respective mass of said article, and detecting means located along the route of conveyor travel a predetermined distance beyond said selected location for identifying those articles which deflect under the influence of said impulse imparting means at a velocity greater than a predetermined velocity.

2. The invention according to claim 1 wherein said detecting means includes a photoelectric device controlled by a beam of light disposed for interruption by those articles which deflect at a velocity greater than said predetermined velocity.

3. The invention according to claim 1 wherein said detecting means includes a separator member for guiding through respective channels the articles which deflect at a velocity above and below a predetermined velocity.

4. The invention according to claim 3 wherein the means for detecting articles which deflect at a velocity above the predetermined velocity include a fluidic sensor operable in response to the backpressure developed by an article traversing the respective channel.

5. The invention according to claim 1 wherein said carriers are adapted to grip the lower-most edge of said articles.

6. The invention according to claim 1 wherein said carriers are adapted to grip the upper-most edge of said articles.

7. The invention according to claim 1 wherein said carriers are provided with releasable jaws for gripping an edge of said articles, and including reject means disposed along the route of said conveyor beyond said detecting means, said reject means being operable to release the gripping jaw of a carrier for an article in response to detection of the same article by said sensing means.

8. The invention according to claim 7 including means disposed at the location of said reject means operable when an article is released by the gripping jaw of its associated carrier for forcibly removing the article from said carrier.

9. The invention according to claim 8 wherein said means for forcibly removing an article comprises an air jet directed against said article in a direction substantially perpendicular to the direction of travel of said article.

10. The invention according to claim 1 wherein said impulse imparting means comprises a jet of air directed against said articles in a direction substantially perpendicular to the direction of travel of said articles.

11. A method for detecting among a series of substantially flat pouch-like articles of uniform size fabricated from flexible sheet material those articles whose mass falls below a predetermined norm comprising the steps of, individually supporting said articles for pivotal movement about one edge thereof, conveying said articles seriatim and edgewise at a predetermined velocity while so supported, imparting a deflecting impulse to each said article upon reaching a selected location along its path of travel, said impulse being directed against the face of the article perpendicularly to its direction of travel and being of sufficient force to deflect the article about its said one edge, and identifying those articles which deflect more than a normal extent while traveling a predetermined distance beyond said selected location.

12. A method according to claim 11 wherein identifying the articles which deflect more than a normal extent includes retaining said articles in their deflected condition after reaching said predetermined distance beyond said selected location.

13. A method according to claim 11 wherein identifying those articles which deflect more than the normal extent includes sensing the deflected articles after they reach said predetermined distance beyond said selected location.

14. A method according to claim 11 wherein said articles are supported by gripping one edge thereof, and including the step of rejecting those articles which deflect more than a normal extent by discontinuing the gripping thereof.

References Cited

UNITED STATES PATENTS

| 3,319,784 | 5/1967 | Granger | 209—79X |
| 3,359,702 | 12/1967 | Beert et al. | 53—53 |

RICHARD A. SCHACHER, Primary Examiner

G. A. CHURCH, Assistant Examiner

U.S. Cl. X.R.

53—53